United States Patent [19]

Himmelwright

[11] Patent Number: 5,018,823
[45] Date of Patent: May 28, 1991

[54] SINGLE CHANNEL HIGH POWER FIBER OPTIC CONNECTOR

[75] Inventor: Gary S. Himmelwright, Goleta, Calif.

[73] Assignee: Santa Barbara Research Center, Goleta, Calif.

[21] Appl. No.: 398,878

[22] Filed: Aug. 28, 1989

[51] Int. Cl.⁵ .................................. G02B 6/38
[52] U.S. Cl. ........................ 350/96.21; 350/96.20
[58] Field of Search ............... 350/96.21, 96.20, 96.22

[56] References Cited

U.S. PATENT DOCUMENTS

| | | | |
|---|---|---|---|
| 4,717,234 | 1/1988 | Barlow et al. | 350/96.21 |
| 4,747,659 | 5/1988 | Takahashi | 350/96.21 |
| 4,890,897 | 1/1990 | Cook | 350/96.21 |
| 4,900,124 | 2/1990 | Lampert et al. | 350/96.20 X |
| 4,900,125 | 2/1990 | Iyer | 350/96.21 |

Primary Examiner—John D. Lee
Assistant Examiner—Phan Thi Heartney
Attorney, Agent, or Firm—W. C. Schubert; W. K. Denson-Low

[57] ABSTRACT

A fiber optic connector apparatus (10) for coupling two fiber optic cables (12, 14) including a pair of connectors (48, 98) permanently attached to the fiber optic cables (12, 14). The connectors include a protruding portion (58, 102) with a central opening therethrough for receiving the fiber optic cables (12, 14). The protruding portions have a flat face (56) on their distal end and the optical fibers (16, 26) are inserted into the protruding portion (58, 102) so that end of the optical fiber (16, 26) lies in the plane of the flat face of the protruding portion (58, 102). A recessed portion (60, 104) in the flat face surrounds the optical fiber end to create an air space around the optical fiber ends. An interconnect member (86) removably adjoins a pair of the connectors (48, 98) so that the optical fiber ends are held in close proximity to each other. The close proximity reduces transmission losses and the recessed portion (60, 104) reduces the possibility of damage to the optical fiber ends should high power light energy escape at the interface and melt the parts of the connector. The connector apparatus (10) also permits the optical fiber ends to be easily inspected and cleaned when disconnected.

12 Claims, 2 Drawing Sheets

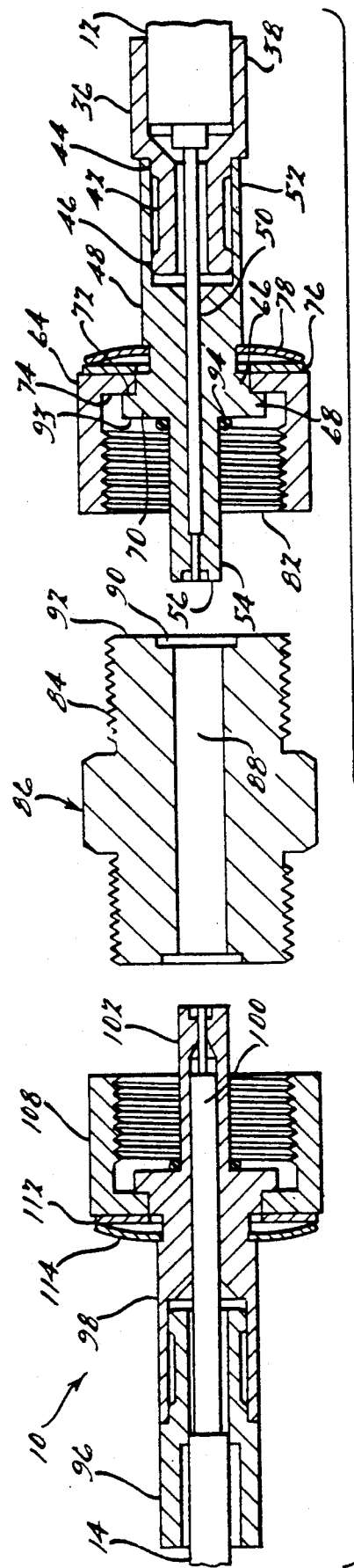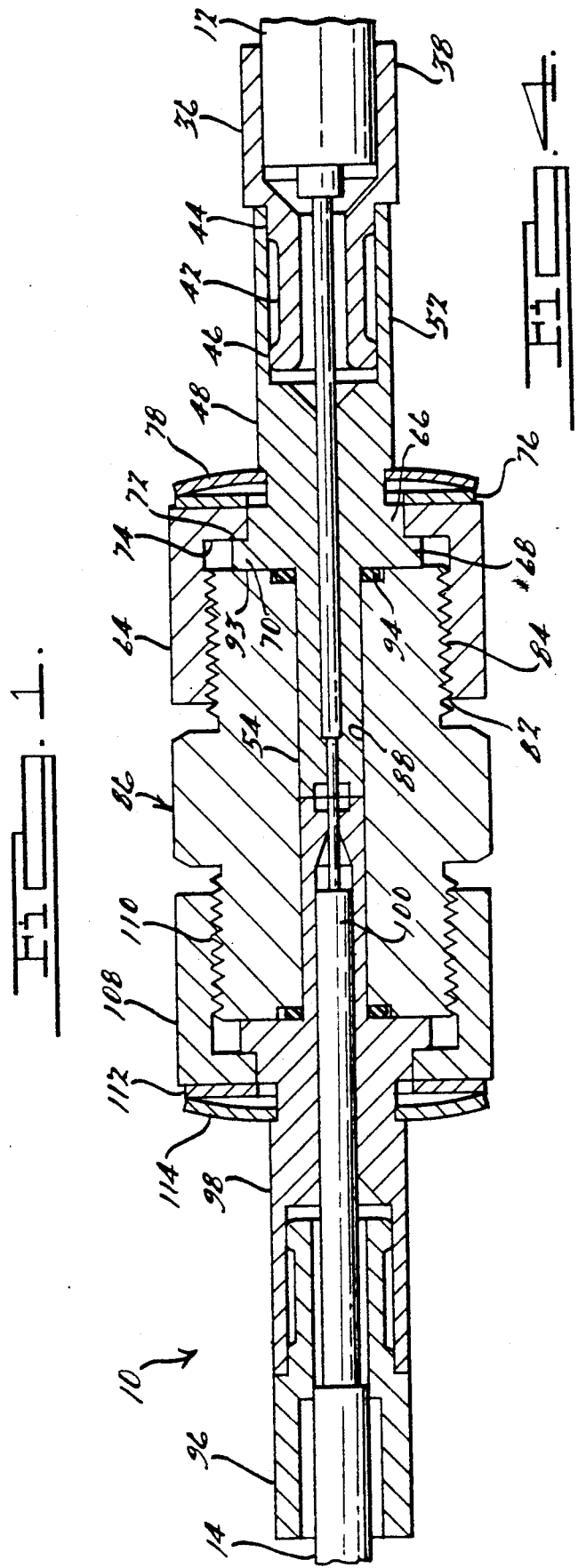

SINGLE CHANNEL HIGH POWER FIBER OPTIC CONNECTOR

This invention was made with government support under Contract No. F04704-86-C-0165 awarded by the Department of the Air Force. The government has certain rights in this invention.

BACKGROUND OF THE INVENTION

1. Technical Field

This invention relates to fiber optic systems and, more particularly, to a fiber optic connector.

2. Discussion

Fiber optic cables are used in a wide variety of systems. These applications range from low power systems in areas such as illumination and communications, to high power systems such as laser surgery and laser firing units While fiber optic cables are relatively efficient transmitters of electromagnetic energy, significant losses in transmission efficiency can occur at interface points. These interface points may occur where two separate cables are connected, or where a cable is terminated and light enters or exits a cable from adjacent devices.

There are many reasons for significant losses at the interfaces. Among these include the loss of light due to divergence or spreading of light rays exiting an optical fiber For example, where it is desired to couple the light from one optical fiber to another, the divergence of the light rays upon exiting one optical fiber will cause some light to miss the adjacent optical fiber. Diffraction of the exiting light rays will cause a similar effect.

Transmission losses may also be caused by misalignment of the coupled optical fibers or by lack of perpendicularity of the terminal face of the fibers. These situations may cause transmission losses by causing some light rays to miss the receiving fiber, or to be reflected by the receiving fiber. Another cause of transmission losses at optical fiber interfaces is contamination by dust or other particles which will absorb the transmitted light. Accordingly, it is important that a fiber optic connector maintain the fiber ends in close proximity, and in accurate alignment.

Besides transmission losses, a number of other problems are frequently encountered at fiber optic couplings. Because of the forces applied to optical fibers at the coupling during coupling and decoupling, damage to the optical fiber is frequently experienced at or near the coupling. To minimize damage to optical couplings by forces applied during handling, an effective means of strain relief is necessary. In addition, damage to the fiber can be caused during mating and demating by contact with the adjacent coupling if the couplings are misaligned during mating.

The above problems are even more acute in high power optical fiber applications. In such applications light losses become critical because any stray light may cause damage to the optical fiber connector itself. For example, such stray light may melt the adjacent connector material. Not only may such melting compromise the structural integrity of the connector, but the melted material can deposit itself on the optical fiber and cause further transmission losses. This is usually catastrophic in high power applications because any contamination on the face of the optical fiber will absorb the light energy, heat up, and seriously damage the optical fiber. In particular, when high power laser pulses in the range of 425 milliJoules (mJ) are transmitted through conventional optical fiber couplers (such as G and H, Part No. 211133), damage frequently occurs for the above described reasons. An additional problem with conventional fiber optic connectors is that while it is important to inspect and clean fiber optic faces at coupling points, the geometry of the coupler frequently makes cleaning and inspecting the fiber optic face difficult.

In view of the above problems, it would be desirable to provide an optical fiber coupling device which minimizes transmission losses even at high power. In addition, it would be desirable to provide an optical fiber coupler which aligns the two fibers to be coupled in very close proximity while keeping the optical fiber faces perpendicular. In addition, it would be desirable to provide an optical fiber connector having a geometry such that even where light does escape and melt surrounding connector material, this melted material will not reach the optical fiber faces.

Further, it would be desirable to provide such an optical fiber connector that can be mated and demated repeatedly without damage to the fibers. It would further be desirable to provide an optical fiber coupler which incorporates strain relief to prevent damage to he optical fiber during handling. Also it would be desirable to provide an optical fiber coupler which would permit cleaning and inspecting of the optical fiber faces with relative ease.

SUMMARY OF THE INVENTION

Pursuant to the present invention, an apparatus for coupling optical fibers is provided having a pair of connectors each with an axial opening extending therethrough for receiving the optical fibers. The connectors include a protruding portion having a substantially flat face at its distal end, the plane of the face being perpendicular to the axial opening. The face on the protruding portion is provided with a recessed portion surrounding the axial opening so that when the optical fiber is inserted into the opening, the optical fiber end extends into the recessed portion and into the plane of the face. The connectors, each containing an optical fiber, are then joined by an interconnect unit which removably secures the connector units so that the optical fiber faces are in close, parallel alignment with each other. In this way, the space formed by the recessed portions of the connectors surrounds the optical fiber interface to minimize the possibility of melted connector material reaching the fiber ends.

BRIEF DESCRIPTION OF THE DRAWINGS

The various advantages of the present invention will become apparent to one skilled in the art by reading the following specification and by reference to the drawings in which:

FIG. 1 is a cross-sectional view of the various components of the present invention before mating;

FIG. 4 is a cross-sectional view of the various components of the present invention shown in the mated configuration.

DESCRIPTION OF THE PREFERRED EMBODIMENT

Figure 5:
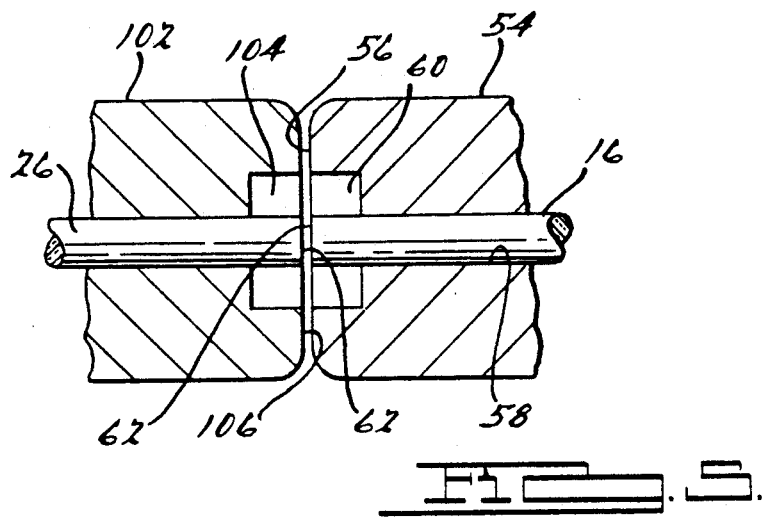
FIG. 5 is an expanded cross-sectional view of the interface portion of the mated connectors.

Turning now to the drawings, a fiber optic connector apparatus 10 is provided for coupling electromagnetic energy carried by two fiber optic cables 12 and 14, as shown in FIG. 1. Fiber optic cables 12 and 14 may be conventional fiber optic cables as shown in more detail in FIGS. 2 and 3. The first fiber optic cable 12 shown in FIG. 2 has an overall diameter of about 4.3 millimeters, and include an optical fiber having a diameter of 0.432 millimeters. The second optical fiber optic cable 14 shown in FIG. 3 is similar to the first, with the primary difference being that the overall diameter is only about 2.2 millimeters. The diameter of the optical fiber in the second fiber optic cable 14 is the same as the first, about 0.432 millimeters.

The 4.3 millimeter fiber optic cable 12 is composed of five discrete layers. At the center is a conventional optical fiber 16 having a diameter of 0.432 millimeters for carrying electromagnetic energy. Surrounding the optical fiber is a tube 18 forming a first inner layer 18 having a diameter of about 0.73 millimeters, which loosely encases the optical fiber 16. The first inner layer 18 may be made of a material such as Tefzel. The second inner layer 20 surrounds the first inner layer 18 and has a diameter of about 2 millimeters. The second inner layer 20 may be composed of a material such as Hytrel. Surrounding the second inner layer 20 is a layer of Kevlar fibers 22 which are used to provide strain relief as will be described in more detail below. An outer layer 24, which may be composed of polyurethane, has a diameter of 4.3 millimeters and surrounds the layer of Kevlar fibers 22.

It will be appreciated that the 4.3 millimeter fiber optic cable 12 is conventional in the art and may be obtained from Fnsign Bickford company of Avon, Conn. FIG. 3 shows the 2.2 millimeter optical cable 14, which, like the 4.3 millimeter fiber optic cable 12, includes a 0.432 millimeter optical fiber 26; a first inner layer 28 composed of 0.73 millimeter Tefzel tube; a second inner layer 30 composed of a 1.4 millimeter hytrel tube; a layer of Kevlar fibers 31; and an outer layer 34 composed of a 2.2 millimeter polyurethane tube. The 2.2 millimeter fiber optic cable 14, like 4.3 millimeter fiber optic cable 12, is conventional in the art and may be obtained from the same source as the 4.3 millimeter fiber optic cable.

Figure 2:
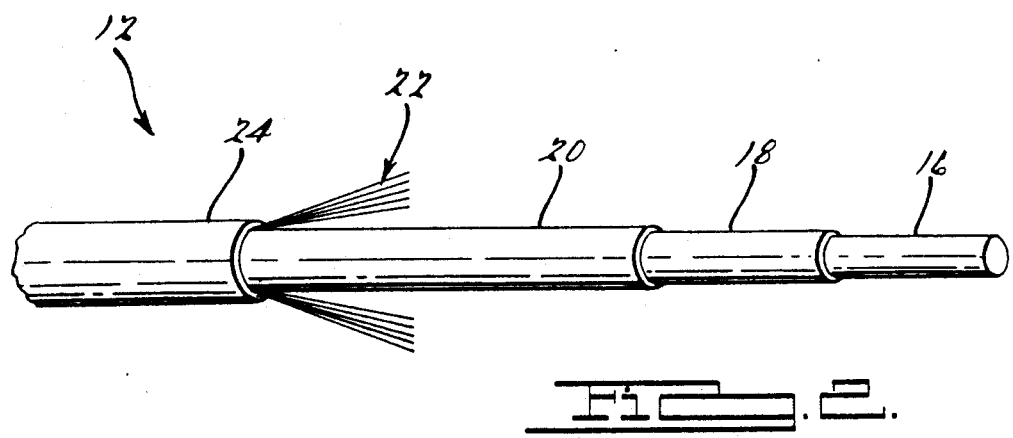
FIG. 2 is a perspective view of one type of convention optical cable used in the present invention.
Figure 3:
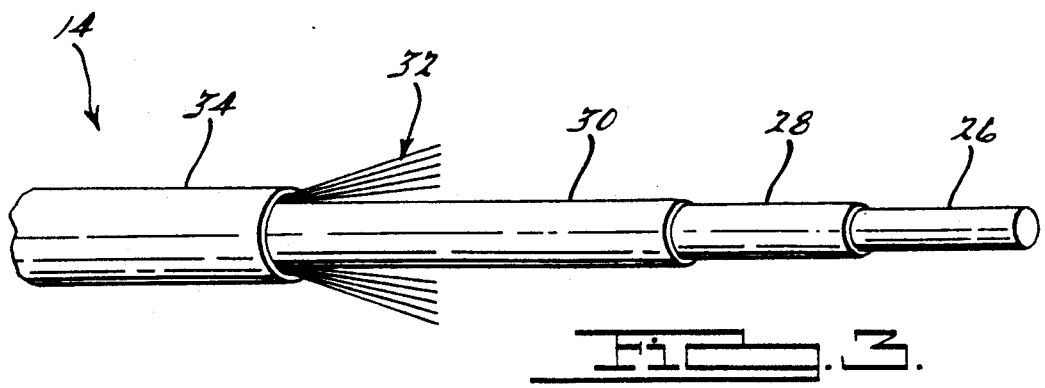
FIG. 3 is a perspective view of a second type of conventional optical cable used in the present invention.

As shown in FIGS. 2 and 3, the 4.3 and 2.2 millimeter fiber optic cables 12 and 14, are prepared for use with the fiber optic connector of the present invention by stripping successive layers so that each layer is exposed along a predetermined length. Referring again to FIG. 1, the 4.3 millimeter fiber optic cable 12, having been prepared as indicated in FIG. 2, is inserted into a crimping tip 36 which has, on one end, an annular portion 38 having an inside diameter of about 4.3 millimeters so that the outer casing 24 of the 4.3 millimeter fiber optic cable 12 may be inserted therein. Crimping tip 36 also has on its other end a reduced diameter portion 42 having an inside diameter which receives the first inner layer 18 of the 4.3 millimeter fiber optic cable 12. The crimping tip 36 also has two raised crimping surfaces 44 and 46 to facilitate the crimping procedure as will be explained in more detail below. Crimping tip 36 may preferably be constructed of a conventional material such as 304 stainless steel Kevlar fibers 22 are bent around reduced diameter portion 42 of the crimping tip 36 to provide strain relief. When the optical fiber cable 12 is pulled in tension, it is necessary that the Kevlar fibers 22 pull tight before the strain is taken up by the glass core 16. Thus it is desirable to pretension the Kevlar fibers 22 before the crimping process.

A first ferrule 48 has a central opening 50 for receiving the first inner tube 18 of the 4.3 millimeter fiber optic cable 12. Ferrule 48 is composed of a copper nickel zinc alloy in the preferred embodiment. However, it will be appreciated that o&her materials may also be used. On one end, the first ferrule 48 has an outer crimping portion 52 which fits over the crimping surfaces 44 and 46. By means of a conventional crimping tool, the ferrule 48 may be permanently attached to the crimping tip 36 by causing the crimping portion 52 to be deformed around the crimping surface 42 of the crimping tip 36. Ferrule 48 also includes a protruding cylindrical portion 54 having a flat face 56 perpendicular to the axis of the ferrule 48 central opening 50. The protruding portion 54 also includes a reduced diameter central opening portion 58 which has a diameter of appropriate size to permit the optical fiber 16 to snugly fit therein.

Adjacent the face 56 is a recessed portion 60 which is seen more clearly in FIG. 5. Recessed portion 60 forms an annular dish shaped opening which surrounds the optical fiber 16. It will also be seen that optical fiber 16 is inserted into the ferrule 48 so that the end face 62 of optical fiber 16 is in the same plane as the end face 56 of ferrule 48 It is important that ferrule face 56 and optical fiber face 62 be polished to relatively tight tolerances so that the surfaces are flat and in the same plane. For example, one model of polishing to achieve the desired tolerance would be to mount the fiber 16 so that it initially protrudes beyond face 56. Recessed portion 60 is then filled with a hard wax. Then the fiber and ferrule are polished in a carefully controlled manner. Afterwards, the hard wax may be dissolved. Such polishing is desirable because, in accordance with the present invention, these faces will be positioned adjacent to the corresponding faces in a coupled optical fiber, so that the interface between them is controlled to be extremely close. For example, a separation of 0.005 inches or less is desirable, as will be explained in more detail below.

Further, to maintain the ferrule face 56 and the fiber optic face 62 in the same plane, relative movement of the optical fiber 16 with the ferrule 48 must not occur. Prevention of such movement is accomplished by bonding the optical fiber 12 inside the ferrule 48 at reduced diameter portion 58. This bonding may be accomplished by filling opening 58 with an adhesive such as 3M Scotchbond 2216 prior to inserting the fiber.

Attached to ferrule 48 is a nut 64 which may be attached to the ferrule 48 by sliding over the crimp portion 52 until it reaches annular raised portion 66 of the ferrule 48. Annular raised portion 66 includes a first raised portion 68, and a second raised portion 70 having a larger diameter than portion 68. Raised portion 70 has a seat portion 72 which mates with a seat portion 74 of the nut 64. Also, the inner diameter of nut 64 is slightly larger than the outer diameter of raised portion 68. To retain nut 64 in transverse alignment with the ferrule 48, a washer 76 and a spring clip 78 engage with the nut 64. In this way, spring clip 78 retains the washer 76 and the nut 64 in a locked position by engaging with recessed portion 80 of ferrule 48. Consequently, nut 64 may not be moved axially along ferrule 48 but may rotate about ferrule 48 in alignment with raised diameter portion 70.

Nut 64 also contains threads 82 on its inside diameter for engagement with corresponding threads 84 on an interconnect member 86. In general, the fiber optic cable 12, having crimping tip 36, ferrule 48, and nut 64 attached thereto, may be mated with another optical fiber having identical crimping tip 36, ferrule 48, and nut 64 attached thereto, in accordance with the preferred embodiment of the present invention. To accomplish mating, interconnect 86 is first attached to one ferrule 48 as shown in FIG. 2. First, protruding portion 54 of ferrule 48 is inserted into a central opening 88 in connector 86. During insertion, nut 64 threads 82 contact interconnect threads 84, and nut 64 is rotated until ferrule protruding portion 54 is brought progressively deeper into central opening 88.

Interconnect 86 also contains a recessed portion 90 and a transverse face 92. Nut 64 is rotated until transverse face 92 makes contact with a transverse face 93 in ferrule 48. In accordance with the preferred embodiment, an O-ring 94 is placed over protruding portion 58 until it rests on ferrule transverse face 93 before the protruding portion 54 is inserted into the interconnect. Thus, when nut 64 is rotated into an engagement with threads 84, O-ring 94 will make contact with the recessed portion 90 and be compressed until face 92 contacts face 93. In this way, O-ring 94 creates an environmentally tight seal to protect the optical fiber 16.

To mate fiber optic cable 12 with an identical fiber optic cable 12, the mating optical fiber is fitted with identical components including the crimping tip 36, the ferrule 48, the nut 64, washer 76 and spring clip 78 as described above. This identical optical cable assembled unit is then inserted into the opposite end of the interconnect 86 in a manner similar to the first assembled unit. Tightening the nut 64 until face 92 contacts face 93 will thereby cause the ferrule face 56 and optical fiber face 62 to line up, close to, but not touching the adjacent ferrule face 56 and optical fiber 62 as shown in FIG. 4.

In accordance with an alternative embodiment, it may be desirable to mate 4.3 mm fiber optic cable 12 with a 2.2 mm fiber optic cable 14. This is accomplished as shown in FIG. 2 by first attaching a crimping tip 96 to the 2.2 mm optical cable 14. Crimping tip 96 is similar to crimping tip 36 with the exception that its diameter is configured to accept the 2.2 mm optical fiber 14. The ferrule 98 central opening 100 is adapted to receive first inner layer 28. The only major distinction between using the 4.3 fiber optic cable 12 and the 2.2 mm fiber optic cable 14 is that 2.2 mm fiber is designed to have strain relief taken up by a separate ruggedization which bundles several fibers together.

Besides this distinction, the 2.2 mm fiber optic cable 14 is coupled in a similar manner, by use of ferrule 98, having protruding portion 102, with recess 104, and flat face 106. Also ferrule 98 is coupled to connector 86 by means of nut 108, having threads 110, washer 112 and clip 114. Other corresponding details are the same as discussed above in connection with the 4.3 mm fiber optic cable 12.

As evident in FIG. 5, in the mated position recesses 60 and 104 in the adjacent mated ferrules 48 and 98 create an air space surrounding the interface between adjacent optical fibers 16 and 26. While the close proximity of the two optical fiber faces 62, for example 0.005 inches or less, will reduce the amount of light which escapes from the optical fibers 14 and 16, should some light escape it would have to travel through the air space in the recesses 60 and 104 before reaching ferrule 48. In the preferred embodiment this distance is at least 0.020 inches away from the fiber faces 62. At light energy of 425 milliJoules, the deposited energy could easily be sufficient to melt the copper-nickel-zinc material of the ferrules 48 and 98. However, because of the geometry and this relatively large distance, it is unlikely that the melted material could be deposited back onto the face of either optical fiber 16 or 26. Further, the greater distance will lessen the damage to the ferrules 48 and 98.

It can be seen that in the demated configuration optical fiber faces 62 can be readily inspected and cleaned if necessary. Also, because of the relative close proximity of the two optical fiber faces 62 in the mated condition, transmission losses at the fiber interface is low. For example, it has been found to range between 2% and 7% in some cases. In addition, it can be appreciated that the optical fiber connector 10 can be mated and demated numerous times without damage Also, the optical fiber connector 10 provides an effective means of strain relief to prevent damage to the optical fiber. Those skilled in the art can appreciate that other advantages can be obtained from the use of this invention without departing from the true spirit of the invention after studying the specification, drawings and following claims.

What is claimed is:

1. An apparatus for coupling optical fibers comprising:
   a pair of connectors each having an axial opening extending therethrough for receiving one of said optical fibers;
   said connectors each including a protruding portion having a substantially flat face at its distal end, the plane of said face being perpendicular to said axial opening;
   a recessed portion in said flat face surrounding said axial opening;
   said optical fiber being inserted into said opening in each of said connectors so that the end of each optical fiber extends into said recessed portion, substantially into the plane of said face; and
   interconnect means for removably joining said pair of connectors so that said flat faces are oppositely disposed to one another and said optical fiber ends are placed in close proximity to each other but do not touch, whereby said recessed portions in both connectors create an air space around said optical fiber ends.

2. The connector of claim 1 wherein said interconnect means further comprises:
   a pair of hollow cylindrical nut members rotatably attached to said connectors having threads on their inside diameter; and
   a cylindrical connecting member having threads on its outer surface for engaging with said threads in the nut member.

3. The apparatus of claim 2 further comprising:
   a washer and a spring clip for rotatably securing said nut members to said connectors.

4. The apparatus of claim 1 wherein said optical fibers have at least one casing and said opening in said protruding portion has a reduced diameter portion near the recess, wherein only the optical fiber and not the casing may enter said reduced diameter portion.

5. The apparatus of claim 4 further comprising means for permanently securing the optical fiber casing to said connector.

6. The apparatus of claim 5 wherein said means for permanently securing further comprises:
a crimping tip attached to said optical fiber casing; and
a deformable portion of said connector for crimping around said crimping tip to secure said optical fiber to said connector.

7. The apparatus of claim 1 wherein said protruding portion of said connectors is substantially cylindrical;
said connectors having a flat face adjacent to the base of said protruding portion; and
said interconnect means includes a substantially cylindrical connecting member having an opening therethrough for receiving said protruding portion, and further including a flat face at both ends for engaging with said flat face in the connector, wherein the relative distance between the faces of the protruding portions is determined by the axial length of said interconnect means.

8. The apparatus of claim 7 further comprising:
said interconnect means having a recessed portion at both ends surrounding said opening in said interconnect means;
means for sealing positioned in said recessed portion in said interconnect means, whereby when the flat face of the interconnect means is engaged with the flat face in said connector, said sealing means will prevent external contaminants from reaching said optical fiber ends.

9. The apparatus of claim 1 wherein said interconnect means joins said optical fiber ends about 0.005 inches apart or less.

10. The apparatus of claim 1 wherein said air space created by said recessed portion creates an air gap of at least 0.020 inches between said optical fiber ends and the connectors.

11. The apparatus of claim 1 wherein said connectors are composed of a copper-nickel-zinc alloy.

12. An apparatus for coupling optical fibers comprising:
a pair of connectors each having an axial opening extending therethrough for receiving one of said optical fibers;
said connectors each including a protruding portion having a substantially flat face at its distal end, the plane of said face being perpendicular to said axial opening;
a recessed portion in said flat face surrounding said axial opening;
said optical fiber being inserted into said opening in each of said connectors so that the end of each optical fiber extends into said recessed portion, substantially into the plane of said face;
interconnect means for removably joining said pair of connectors so that said flat faces are oppositely disposed to one another and said optical fiber ends are placed in close proximity to each other but do not touch, whereby said recessed portions in both connectors create an air space around said optical fiber ends;
said optical fibers having at least one casing and said opening in said protruding portion having a reduced diameter portion near the recess, wherein only the optical fiber and not the casing may enter said reduced diameter portion;
means for permanently securing the optical fiber casing to said connector;
said connectors having a flat face adjacent to the base of said protruding portion; and
said interconnector means includes a substantially cylindrical connecting member having an opening therethrough for receiving said protruding portion, and further including a flat face at both ends for engaging with said flat face in the connector, wherein the relative distance between the faces of the protruding portions is determined by the axial length of said interconnect means said relative distance being about 0.005 inches.

* * * * *